(12) United States Patent
Page

(10) Patent No.: US 11,060,345 B2
(45) Date of Patent: Jul. 13, 2021

(54) TEMPORARY WATER BARRIER TO PREVENT FLOODING THROUGH RESIDENTIAL AND COMMERCIAL DOORS

(71) Applicant: Elizabeth Page, Hollywood, FL (US)

(72) Inventor: Elizabeth Page, Hollywood, FL (US)

( * ) Notice: Subject to any disclaimer, the term of this patent is extended or adjusted under 35 U.S.C. 154(b) by 0 days.

(21) Appl. No.: 16/431,780

(22) Filed: Jun. 5, 2019

(65) Prior Publication Data

US 2020/0011127 A1 Jan. 9, 2020

Related U.S. Application Data

(60) Provisional application No. 62/659,296, filed on Apr. 18, 2018.

(51) Int. Cl.
*E06B 7/23* (2006.01)
*E04H 9/14* (2006.01)
*E06B 9/00* (2006.01)

(52) U.S. Cl.
CPC .......... *E06B 7/2318* (2013.01); *E04H 9/145* (2013.01); *E05Y 2800/428* (2013.01); *E06B 2009/007* (2013.01)

(58) Field of Classification Search
CPC .............. E06B 7/2318; E06B 7/2316; E06B 2009/007; E04H 9/145; E05Y 2800/428
See application file for complete search history.

(56) References Cited

U.S. PATENT DOCUMENTS

| | | | | |
|---|---|---|---|---|
| 2,008,741 A | * | 7/1935 | Allan | E06B 7/2318 451/89 |
| 2,530,160 A | * | 11/1950 | Finley | E06B 7/2318 49/477.1 |
| 3,100,918 A | * | 8/1963 | Coverley | E06B 7/2318 49/477.1 |
| 3,507,974 A | * | 4/1970 | Roster | H05K 9/0015 174/367 |
| 3,660,937 A | | 5/1972 | Frach et al. | |
| 3,796,010 A | | 3/1974 | Carlson | |
| 3,918,512 A | | 11/1975 | Kuneman | |
| 3,968,597 A | * | 7/1976 | Hirtle | E06B 7/2318 49/477.1 |
| 4,073,521 A | * | 2/1978 | Mena | B63B 19/24 292/1 |
| 4,098,035 A | | 7/1978 | Bessler | |
| 4,441,278 A | * | 4/1984 | Covey, III | E06B 7/2318 49/477.1 |
| 4,682,443 A | | 7/1987 | Demo | |
| 4,706,413 A | * | 11/1987 | James | A62C 2/06 49/31 |

(Continued)

*Primary Examiner* — Justin B Rephann
(74) *Attorney, Agent, or Firm* — Dunlap Bennett & Ludwig, PLLC; Brendan E. Squire

(57) ABSTRACT

A temporary water barrier for residential and commercial doors. The temporary water barrier is an inflatable bladder that is configured to be installed in a doorway and inflated to create a barrier to water within the jam of the door or opening beneath the door. The elongate bladder has sealed ends, an inflation valve to communicate an inflation fluid to an interior of the bladder. A resilient seal may be provided along one or more of a top surface and a bottom surface of the bladder. A notch may be defined in the bladder with the notch dimensioned to fit around a hinge supporting the door in the doorway.

11 Claims, 4 Drawing Sheets

(56) References Cited

U.S. PATENT DOCUMENTS

| | | | |
|---|---|---|---|
| 4,878,267 A * | 11/1989 | Roach | E06B 7/367 |
| | | | 16/250 |
| 5,077,945 A | 1/1992 | Koeniger | |
| 5,163,187 A * | 11/1992 | Dannenberg | A47K 3/006 |
| | | | 16/223 |
| 5,220,696 A * | 6/1993 | Dannenberg | A47K 3/006 |
| | | | 4/556 |
| 5,279,087 A * | 1/1994 | Mann | E06B 5/164 |
| | | | 49/477.1 |
| 6,425,707 B1 | 7/2002 | Baxter | |
| 6,560,932 B2 * | 5/2003 | Heroux | E06B 7/2316 |
| | | | 49/467 |
| 7,178,810 B1 * | 2/2007 | Kuhary | E06B 7/2318 |
| | | | 277/637 |
| 7,743,560 B2 | 6/2010 | Box | |
| 7,958,674 B2 * | 6/2011 | Meister | E06B 7/2318 |
| | | | 49/318 |
| 8,454,269 B2 | 6/2013 | Johnson et al. | |
| 9,506,285 B2 * | 11/2016 | Eansor | E06B 7/2318 |
| 9,745,795 B2 | 8/2017 | Su | |
| 9,816,314 B2 * | 11/2017 | Eansor | E06B 7/2318 |
| 2002/0062597 A1 * | 5/2002 | Heroux | E06B 7/2316 |
| | | | 49/472 |
| 2002/0113379 A1 | 8/2002 | Giebel | |
| 2003/0167696 A1 * | 9/2003 | Chen | E02B 3/102 |
| | | | 49/477.1 |
| 2004/0045243 A1 | 3/2004 | Lockwood et al. | |
| 2005/0252114 A1 | 11/2005 | Marschall | |
| 2009/0145561 A1 | 6/2009 | Tennant | |
| 2009/0282743 A1 * | 11/2009 | Meister | E06B 7/2318 |
| | | | 49/498.1 |
| 2010/0174401 A1 | 7/2010 | Giacosa et al. | |
| 2014/0223828 A1 * | 8/2014 | Eansor | E06B 7/2318 |
| | | | 49/477.1 |
| 2015/0354268 A1 * | 12/2015 | Eansor | E06B 7/2318 |
| | | | 49/31 |
| 2016/0208546 A1 * | 7/2016 | Gillen | E06B 7/2318 |
| 2017/0058589 A1 | 3/2017 | Williams | |
| 2017/0074035 A1 * | 3/2017 | Eansor | E06B 7/2318 |

* cited by examiner

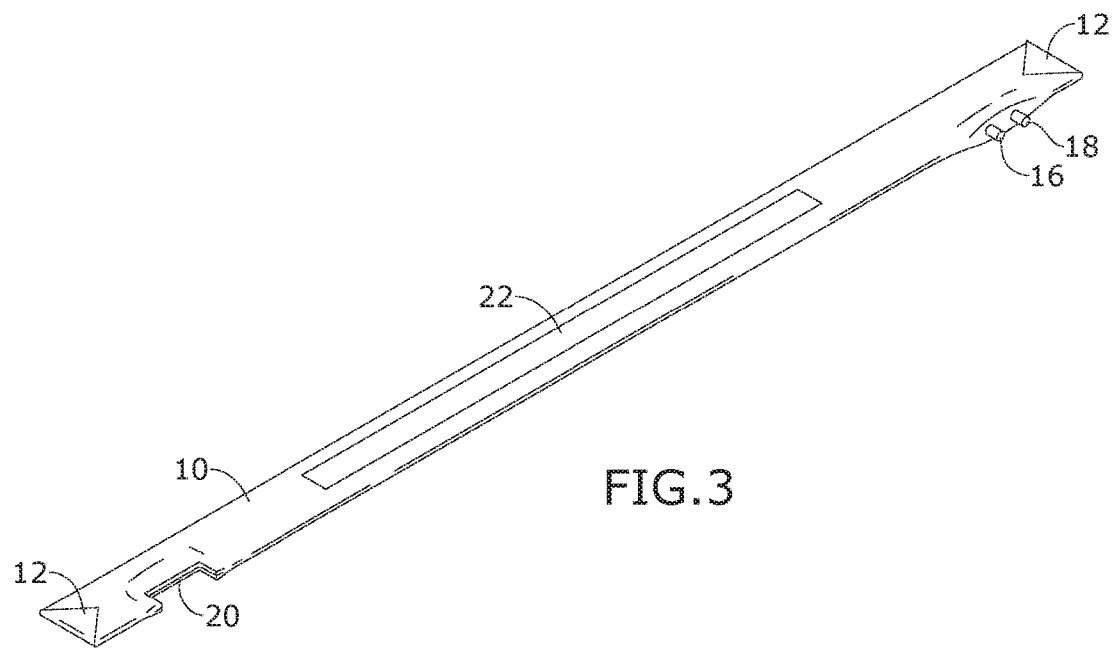
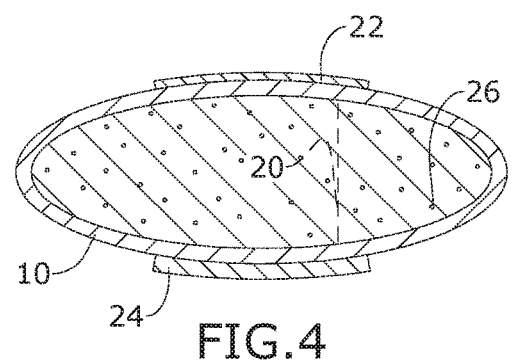
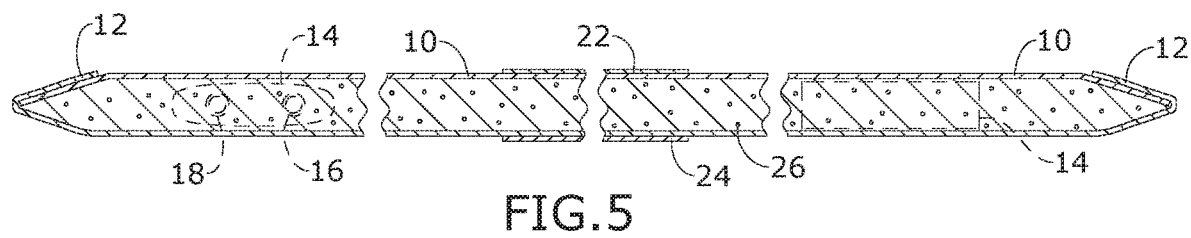

TEMPORARY WATER BARRIER TO PREVENT FLOODING THROUGH RESIDENTIAL AND COMMERCIAL DOORS

CROSS-REFERENCE TO RELATED APPLICATION

This application claims the benefit of priority of U.S. provisional application No. 62/659,296, filed Apr. 18, 2018, the contents of which are herein incorporated by reference.

BACKGROUND OF THE INVENTION

The present invention relates to flood water barriers, and more particularly to flood water barriers for personnel openings to commercial and residential structures, as well as vehicle door openings.

Rising flood waters cause tremendous damage to the interior of both residential and commercial structures. A primary point of flood water infiltration into a structure is the doorway. While the seals around a typical doorway are designed to prevent the ready passage of air, few are designed to prevent the infiltration of water.

As can be seen, there is a need for an improved temporary water barrier that uses the structure of the existing door as part of the barrier and is less expensive than panels and other devices to create a water tight seal.

SUMMARY OF THE INVENTION

In one aspect of the present invention a temporary water barrier for a doorway is disclosed. The temporary water barrier includes an elongate tubular bladder having a sealed first end and second end. The bladder has a length to span an opening of the doorway and a significant portion or entirety of a door jamb defining the doorway. An inflation valve is provided to communicate an inflation fluid to an interior chamber of the bladder.

In some embodiments, a resilient seal is defined along a top surface of the bladder. The seal has a length corresponding to a width of the opening of the doorway. In other embodiments, a resilient seal is defined along a bottom surface of the bladder. The resilient seal has a length corresponding to a width of the opening of the doorway.

In other embodiments, a notch is defined in one of the first end and the second end of the bladder. The notch is dimensioned to receive a hinge supporting the door in the doorway.

In yet other embodiments, an adhesive strip is applied to the end portions of the bladder along a top surface of the bladder.

In other aspects of the invention, a method of protecting a doorway from water infiltration is disclosed. The method includes providing an inflatable bladder that is dimensioned to span an opening of the doorway and significant portion or entirety of a door jamb defining the doorway. The bladder is installed about a bottom end and a lower side edge of a door carried in the doorway.

The method may further include inflating the bladder via an inflation valve in the bladder to expand the bladder to seal a gap between the bottom end of the door and the doorway opening and the lower side edge of the door and the door jamb.

Other embodiments of the method include applying an adhesive carried on a top surface of the inflatable barrier to the lower side edge of the door.

Other embodiments of the method include applying straps to the hinge and door handle end of the unit to facilitate installation.

Yet other embodiments of the method include providing a resilient seal along a top surface of the inflatable bladder. A resilient seal may also be provided along a bottom surface of the inflatable barrier.

Yet other embodiments of the method include positioning a notch defined in the bladder about a hinge carrying the door in the doorway.

These and other features, aspects and advantages of the present invention will become better understood with reference to the following drawings, description and claims.

BRIEF DESCRIPTION OF THE DRAWINGS

FIG. 3 is a top perspective view of the invention, shown deflated;

FIG. 4 is a section view of the invention, taken along line 4-4 in FIG. 1;

FIG. 5 is a section view of the invention, taken along line 5-5 in FIG. 1;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Broadly, embodiments of the present invention provide an easily installed temporary water barrier to prevent the infiltration beneath a doorway during flooding conditions.

Figure 1:
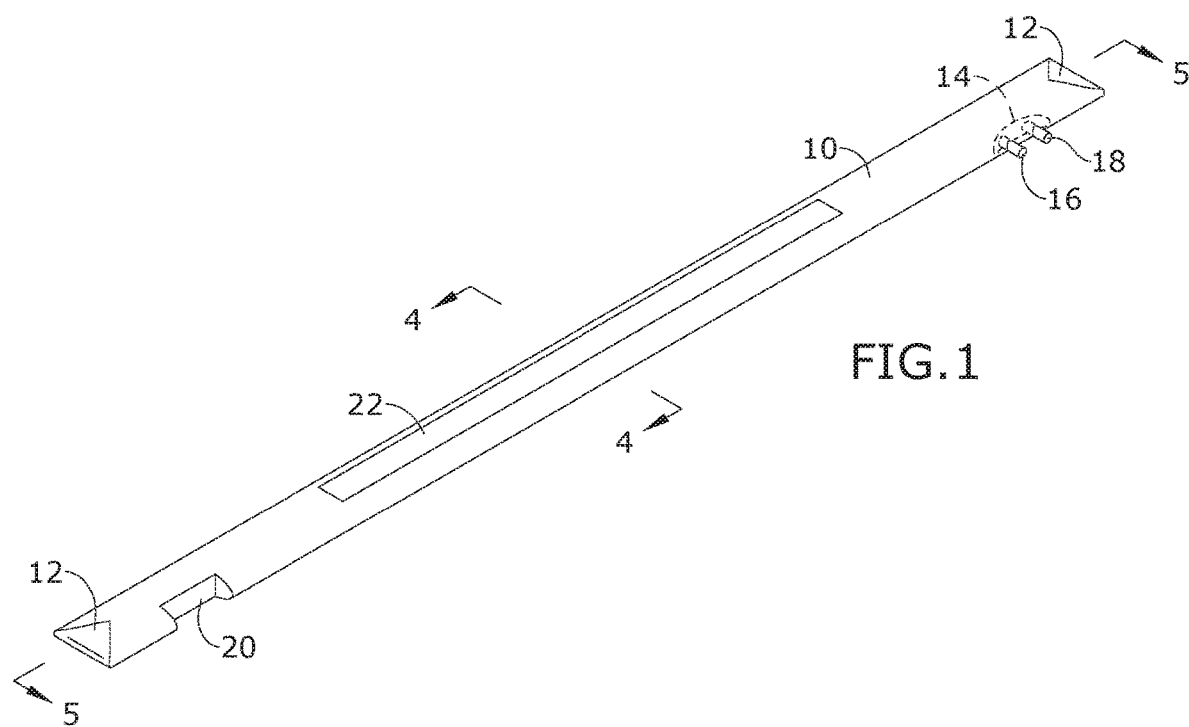
FIG. 1 is a top perspective view of a temporary water barrier according to aspects of the invention, shown in an inflated condition.
Figure 2:
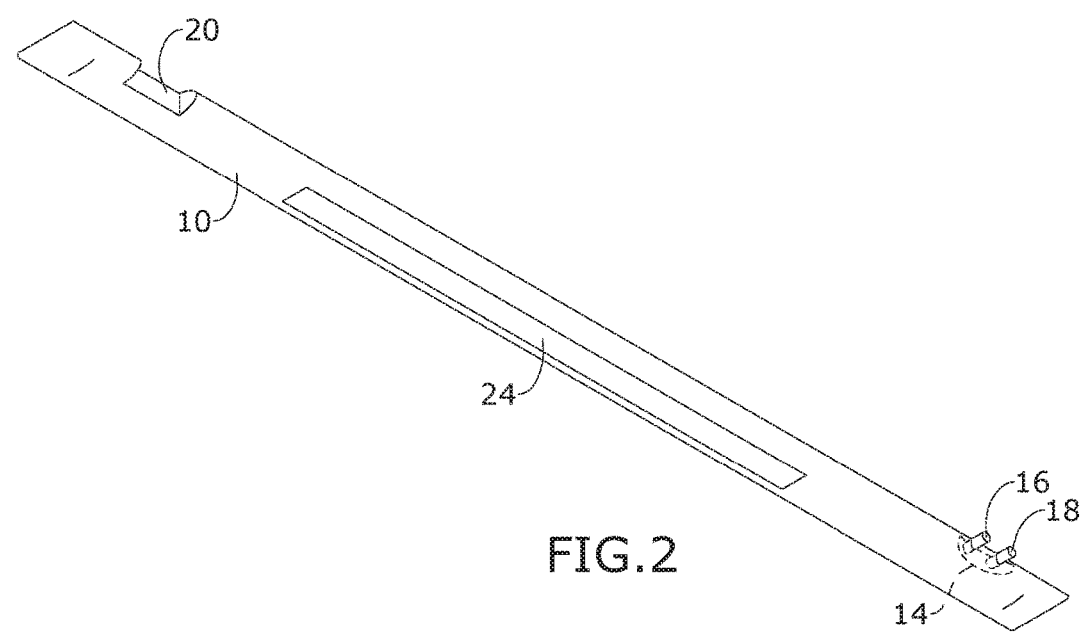
FIG. 2 is a bottom perspective view of the invention, shown inflated.
Figure 6:
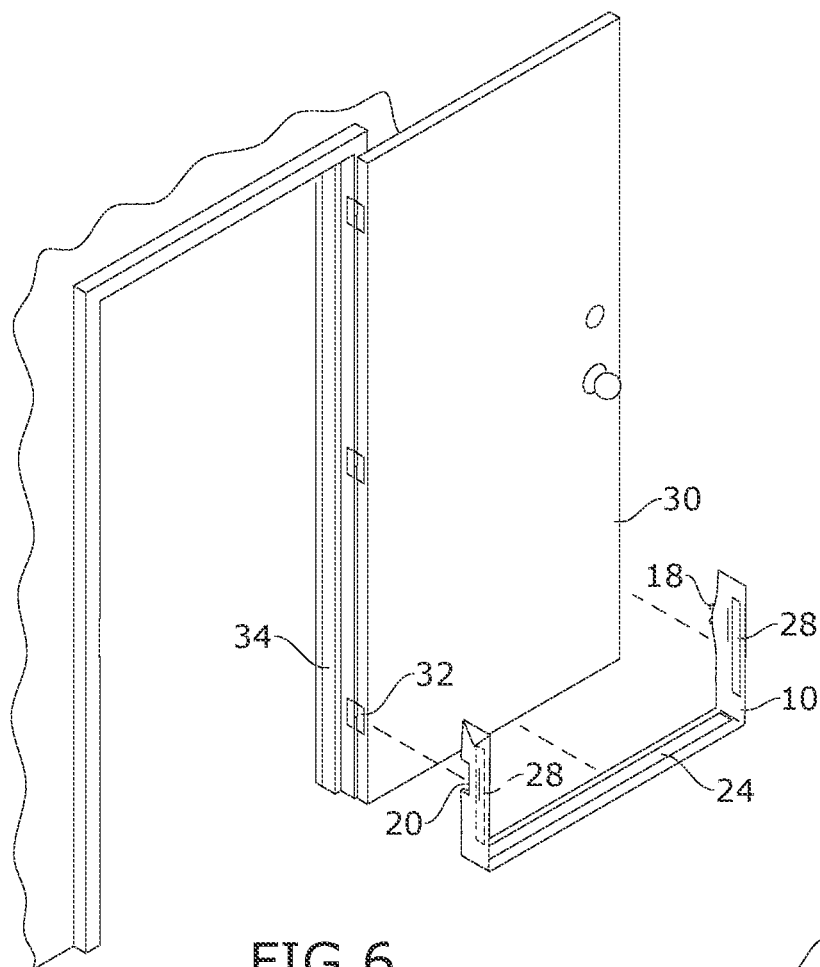
FIG. 6 is a perspective view of the invention, illustrating the installation onto an open door 30.
Figure 7:
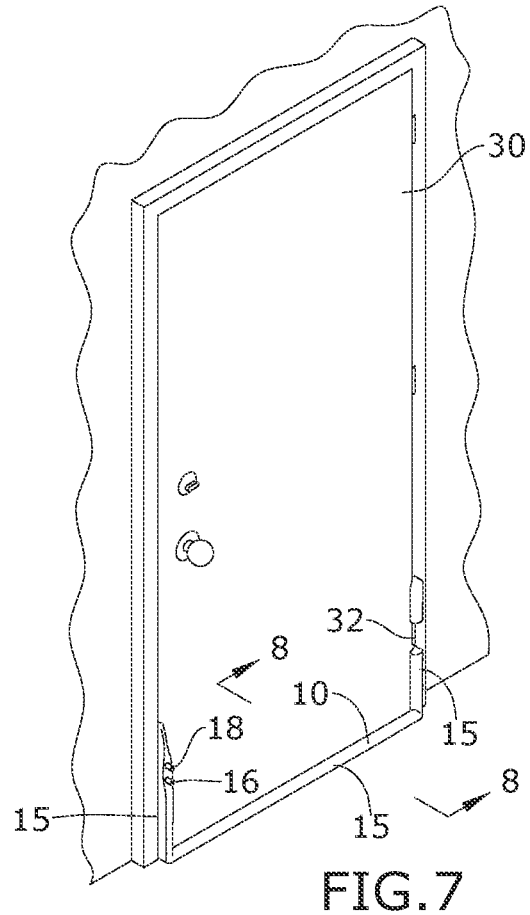
FIG. 7 is a perspective view of the invention, shown in use in an inflated condition.
Figure 8:
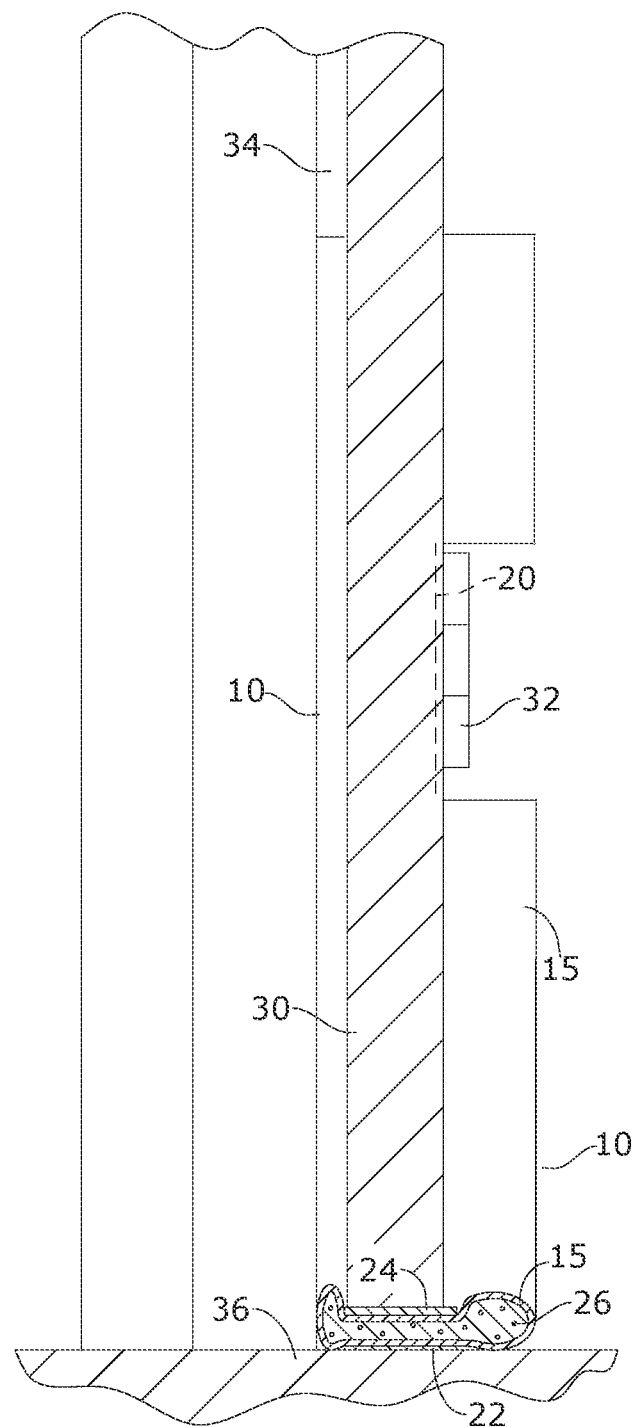
FIG. 8 is a section view of the invention, taken along line 8-8 in FIG. 7.

As seen in reference to the drawings of FIGS. 1-8, the temporary water barrier of the present invention is formed as a durable bladder 10 that can be easily installed in a door jam 34. The bladder 10 is intended to be installed in the jam 34 while the door is open. The lateral ends 12 of the bladder 10 are sealed and positioned along the upright members 34 of the doorway.

An intermediate portion of the bladder 10 is positioned across the threshold or bottom opening in doorways without a threshold member. Once emplaced the door 30 is closed in the doorway, taking care to ensure that the lateral sides of the bladder 10 are disposed on opposed sides of the closed door 30. The lateral sides may be equally distributed between the interior and the exterior of the door 30 or may have a majority of the bladder 10 on an exterior of the door 30.

Once installed and the door 30 is closed, the bladder 10 is inflated so that the expansion of the bladder 10 may seal the edges around the doorway, including the gaps between the jamb 34 and the side edges of the door 30, as well the gap between the lower opening of the doorway between the floor 36 and a bottom edge of the door 30. The lateral edges of the bladder 10 that are not contained between the edges of the door 30 are free to expand to provide a buoyant tubular barrier 15 along the periphery of the interfaces between the door jamb 34, threshold 36 and the door 30. In some embodiments, a notch cutout 20 is provided to provide a gap to receive or fit around a lower hinge 32 of the door 30.

Once expanded, the bladder 10 serves as a temporary barrier to water infiltration through the gaps in the door opening. The bladder 10 is a long, sealed tube which is dimensioned to cover the bottom and, preferably at least one foot of the side door jam 34. Upon closing the door 30, the barrier of the present invention will remain between the door 30, threshold 36, and jam 34.

The bladder 10 may include at least one inflation valve 16, and preferably two inflation valves 13—one inside and one outside of the door 30. The inflation valve 16 may be a Schrader valve for operable coupling to an air compressor or a conventional bicycle pump. Alternatively, the valve 16 may be an oral inflation valve, such as found on an inflatable swimming pool flotation device. Once inflated the bladder 10 will form a sealed barrier across the door 30 for its length. The bladder 10 may also be fitted with pressure gauge stem 18.

In certain embodiments, the top surface of the bladder 10 may include seal 22 formed of a resilient material. In other embodiments, a bottom surface of the bladder 10 may also include a seal 24 formed of a resilient material. The seal 22, 24 may have a length corresponding to a width of the doorway opening.

The seal 22, 24 may also include a plurality of aligned flexible ribs to improve the seal between the door 30 and the bladder 10 as well as the jamb 34, threshold, or floor 36. The plurality of ribs facilitate the sealing qualities of the bladder 10 by forming a hydraulic curtain that multiplies the length in an infiltration pathway between the interior of the structure of water that may be blocked and pooled on the exterior of the barrier. The hydraulic curtain also provides a plurality of sealing interfaces to alleviate the infiltration of water through any voids or gaps that may be present at a single point along the jamb, door or threshold, thereby providing a robust seal between the door and jam.

In some embodiments, the bladder 10 may also include a strip of adhesive material 28 applied to the end portions of the bladder 10 along a top surface of the bladder 10. The strip of adhesive material 28 is provided to allow the end portions of the bladder 10 to be adhered to the vertical side edges of the door 30 so that the end portions can be maintained in position about the door 30 when the water barrier is installed in the doorway. The strip of adhesive material 28 may also improve the seal at the end portions of the bladder 10.

In other embodiments, the bladder 10 may include one or more engineered sections at predetermined lengths corresponding to the standard door widths. The engineered sections allow for a better seal at the corners of the door 30. Advantageously, the temporary barrier of the present invention will use the buoyancy of the exterior, submerged buoyant tubular barrier 15 portion to enhance the securement of the device in the opening and improve the seal. The bladder 10 may include straps at one or more of the hinge and door handle end of the bladder 10 to facilitate installation. While described in the context of a doorway to a structure, the present invention may also be applied to a doorway for a motor vehicle or other fenestration for the prevention of water infiltration.

It should be understood, of course, that the foregoing relates to exemplary embodiments of the invention and that modifications may be made without departing from the spirit and scope of the invention as set forth herein.

What is claimed is:

1. A temporary water barrier for a doorway, comprising:
    a unitary tubular bladder having a sealed first end and second end, the bladder having a length to span an opening of the doorway and at least a lower end of a left and a right door jamb defining the doorway and a width greater than a thickness of a door mounted in the doorway; and
    an inflation valve to communicate an inflation fluid to an interior chamber of the bladder for expansion of the bladder to provide a seal between the door, the left and the right door jamb, and a threshold of the doorway, such that the unitary tubular bladder protrudes as a buoyant tubular barrier from a front face of the door.

2. The temporary water barrier of claim 1, further comprising:
    a resilient seal defined along a top surface of the bladder, the seal having a length corresponding to a width of the opening of the doorway.

3. The temporary water barrier of claim 1, further comprising:
    a resilient seal defined along a bottom surface of the bladder, the resilient seal having a length corresponding to a width of the opening of the doorway.

4. The temporary water barrier of claim 1, further comprising:
    a notch defined in one of the first end and the second end, wherein the notch is dimensioned to receive a hinge supporting a lower end of a door in the doorway.

5. The temporary water barrier of claim 1, further comprising:
    an adhesive strip applied to the end portions of the bladder along a top surface of the bladder.

6. A method of protecting a doorway from water infiltration, comprising:
    providing a unitary inflatable bladder dimensioned to span a threshold of the doorway and a lower portion of a door jamb defining the doorway, the inflatable bladder having a width greater than a thickness of a door carried in the doorway; and
    installing the inflatable bladder about a bottom end and a lower side edge of the door, the bladder inflatable to expand the bladder to form a buoyant tubular barrier that protrudes outwardly from an interface between the bottom end and the lower side edge of the door with the threshold and the door jamb, respectively.

7. The method of claim 6, further comprising:
    inflating the bladder via an inflation valve in the bladder to expand the bladder to form the buoyant tubular barrier.

8. The method of claim 6, further comprising:
    applying an adhesive carried on a top surface of the inflatable barrier to the lower side edge of the door.

9. The method of claim 6, further comprising:
    providing a resilient seal along a top surface of the inflatable bladder.

10. The method of claim 9, further comprising:
    providing a resilient seal along a bottom surface of the inflatable barrier.

11. The method of claim 10, further comprising:
positioning a notch defined in the bladder about a hinge carrying the door in the doorway.

\* \* \* \* \*